United States Patent
Lee et al.

(10) Patent No.: US 7,866,605 B2
(45) Date of Patent: Jan. 11, 2011

(54) ENERGY ABSORBING IMPACT BAND AND METHOD

(75) Inventors: Timothy J. Lee, Mount Laurel, NJ (US); Jason L. Firko, Wilmington, DE (US); Jonathan W. Gabrys, Downingtown, PA (US)

(73) Assignee: The Boeing Company, Chicago, IL (US)

(*) Notice: Subject to any disclaimer, the term of this patent is extended or adjusted under 35 U.S.C. 154(b) by 266 days.

(21) Appl. No.: 11/790,144

(22) Filed: Apr. 24, 2007

(65) Prior Publication Data

US 2008/0265095 A1    Oct. 30, 2008

(51) Int. Cl.
*B64C 1/00*    (2006.01)
(52) U.S. Cl. ............... 244/121; 244/123.1; 244/123.13; 244/123.5
(58) Field of Classification Search ................. 244/121, 244/123.1, 123.13, 123.5, 123.6, 134 A, 134 R
See application file for complete search history.

(56) References Cited

U.S. PATENT DOCUMENTS

| | | | | |
|---|---|---|---|---|
| 3,895,835 A | * | 7/1975 | Thomson | 293/122 |
| 4,428,998 A | * | 1/1984 | Hawkinson | 442/263 |
| 4,569,865 A | * | 2/1986 | Placek | 428/31 |
| 4,706,911 A | * | 11/1987 | Briscoe et al. | 244/134 A |
| 4,747,575 A | * | 5/1988 | Putt et al. | 251/30.02 |
| 4,826,108 A | * | 5/1989 | Briscoe et al. | 244/134 A |
| 4,836,474 A | * | 6/1989 | Briscoe et al. | 244/134 A |
| 4,865,291 A | * | 9/1989 | Briscoe et al. | 251/30.02 |
| 4,895,491 A | * | 1/1990 | Cross et al. | 416/224 |
| 5,141,273 A | * | 8/1992 | Freeman | 293/122 |
| 5,165,859 A | * | 11/1992 | Monroe | 416/224 |
| 5,210,946 A | * | 5/1993 | Monroe | 29/889.71 |
| 5,542,820 A | * | 8/1996 | Eaton et al. | 416/224 |
| 6,182,531 B1 | | 2/2001 | Gallagher et al. | |
| 6,793,256 B2 | * | 9/2004 | Carley et al. | 293/109 |
| 7,008,173 B2 | | 3/2006 | Gabrys et al. | |

OTHER PUBLICATIONS

Cheng-Ho Tho et al., "Accurate Bird Strike Simulation Methodology for BA609 Tiltrotor," Presented at the American helicopter Society 64th Annual Forum, Montréal, Canada, Apr. 29-May 1, 2008, describing use of LS-DYNA on leading edges and other structures, available at <http://www.vtol.org/f64_bestPapers/bestPaper.pdf>, last visited Apr. 3, 2009.

(Continued)

*Primary Examiner*—Timothy D Collins
*Assistant Examiner*—Justin Benedik

(57) ABSTRACT

An energy absorbing apparatus and system for leading edge structures includes an impact member, such as a "bird-band", of a plastically deformable material of a predetermined configuration positioned with the structure in an area of the leading edge of the structure to absorb energy of an impact of a projectile with the leading edge of the structure, and to redistribute the energy of the impact to the structure, and can break up the projectile, and can increase the impact area. The structure can have one or more sheet members, such as a single sheet, or an inner face sheet and an outer face sheet with a core positioned between the inner face sheet and the outer face sheet. One or more impact members of the plastically deformable material can be positioned with one or more of the single sheet, the inner face sheet, the outer face sheet or the core.

17 Claims, 13 Drawing Sheets

OTHER PUBLICATIONS

Livermore Software Technology Corporation, "LS-DYNA—general purpose transient dynamic finite element program," available at <http://www.lstc.com/lsdyna.htm>, last visited Apr. 3, 2009.

Wikiepdia, "Arrestor Wires (for Navy Aircraft Carrier Landings), Section under 'Cross Deck Pendant'," available at, <http://en.wikipedia.org/wiki/Arrestor_wires>, last visited Apr. 3, 2009.

* cited by examiner

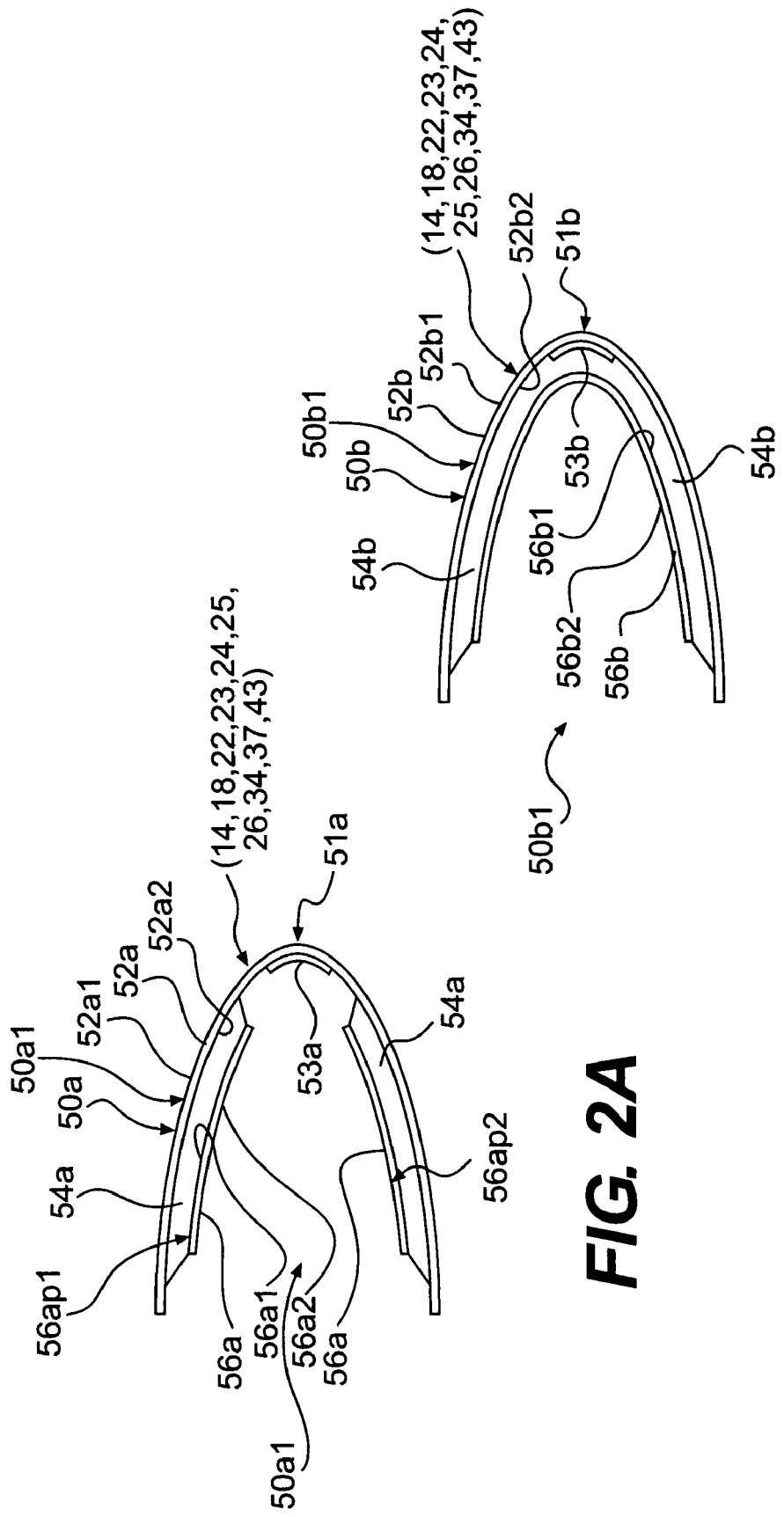

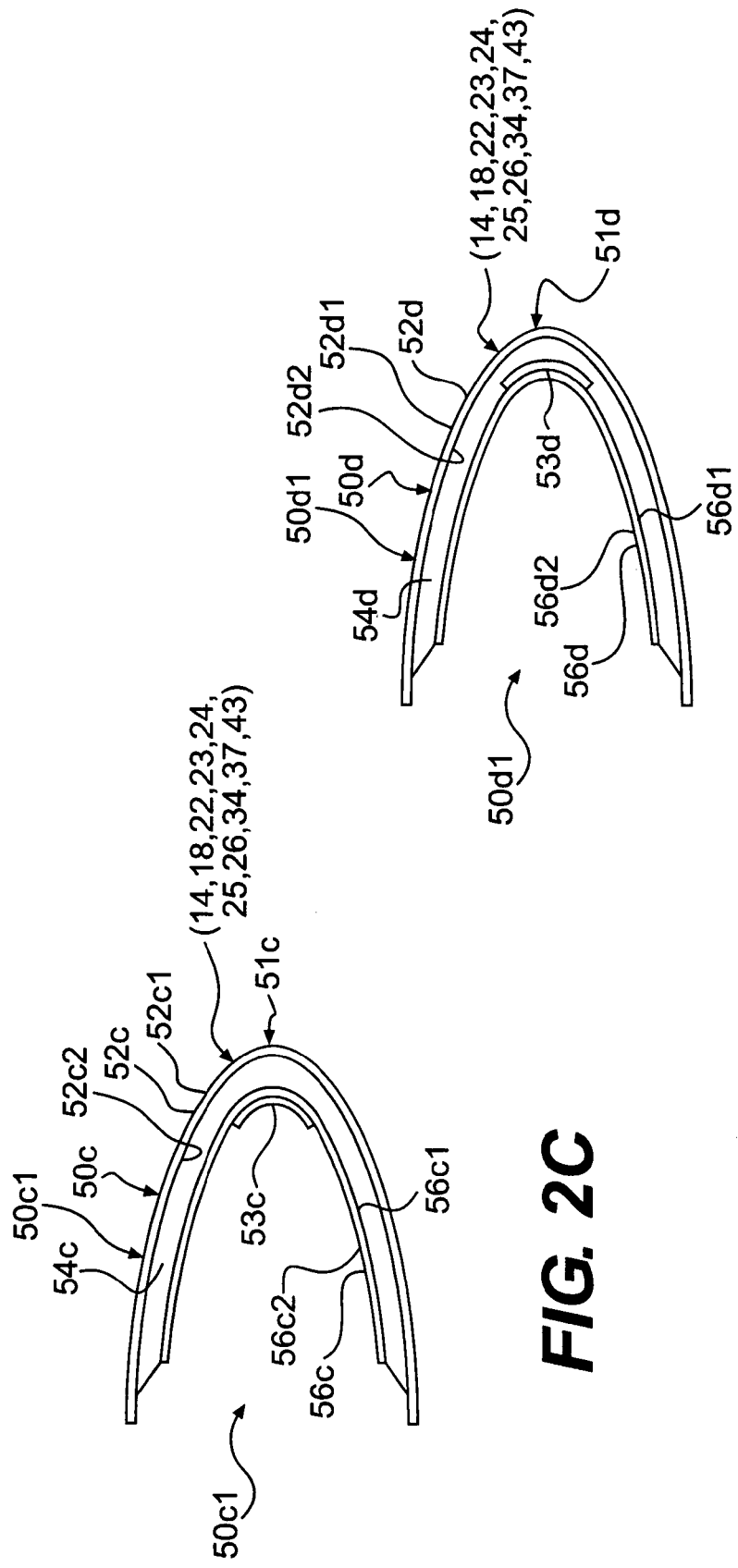

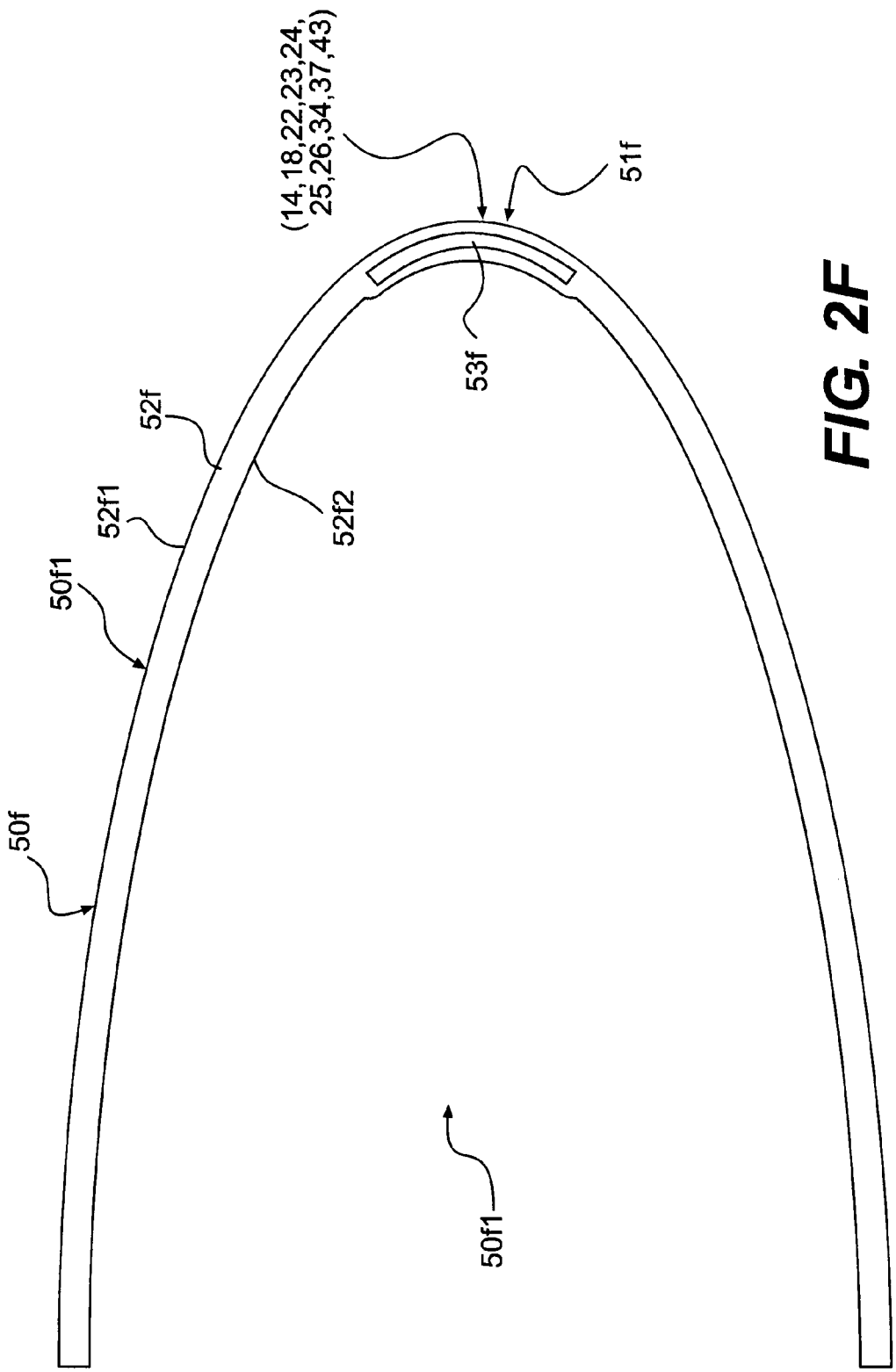

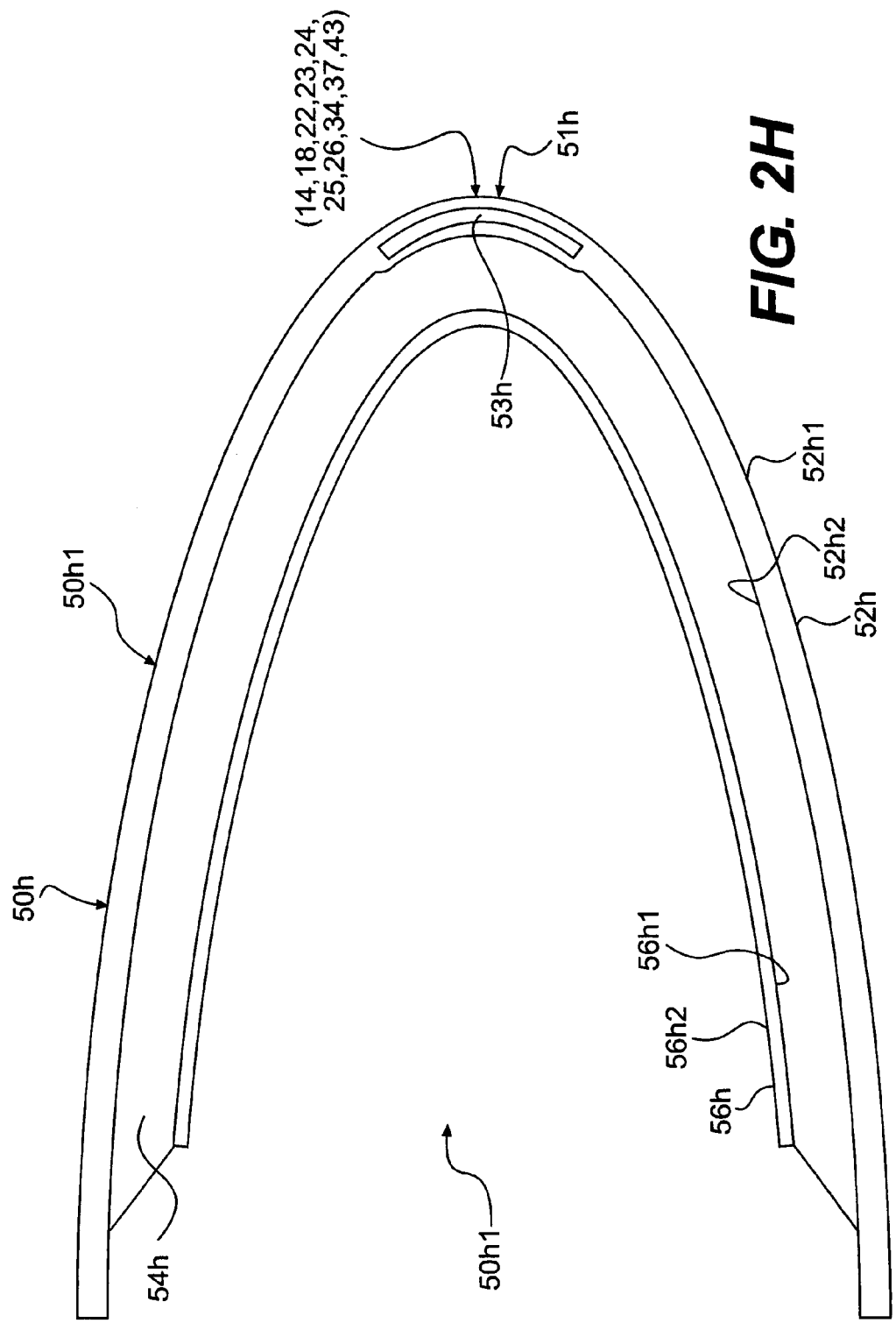

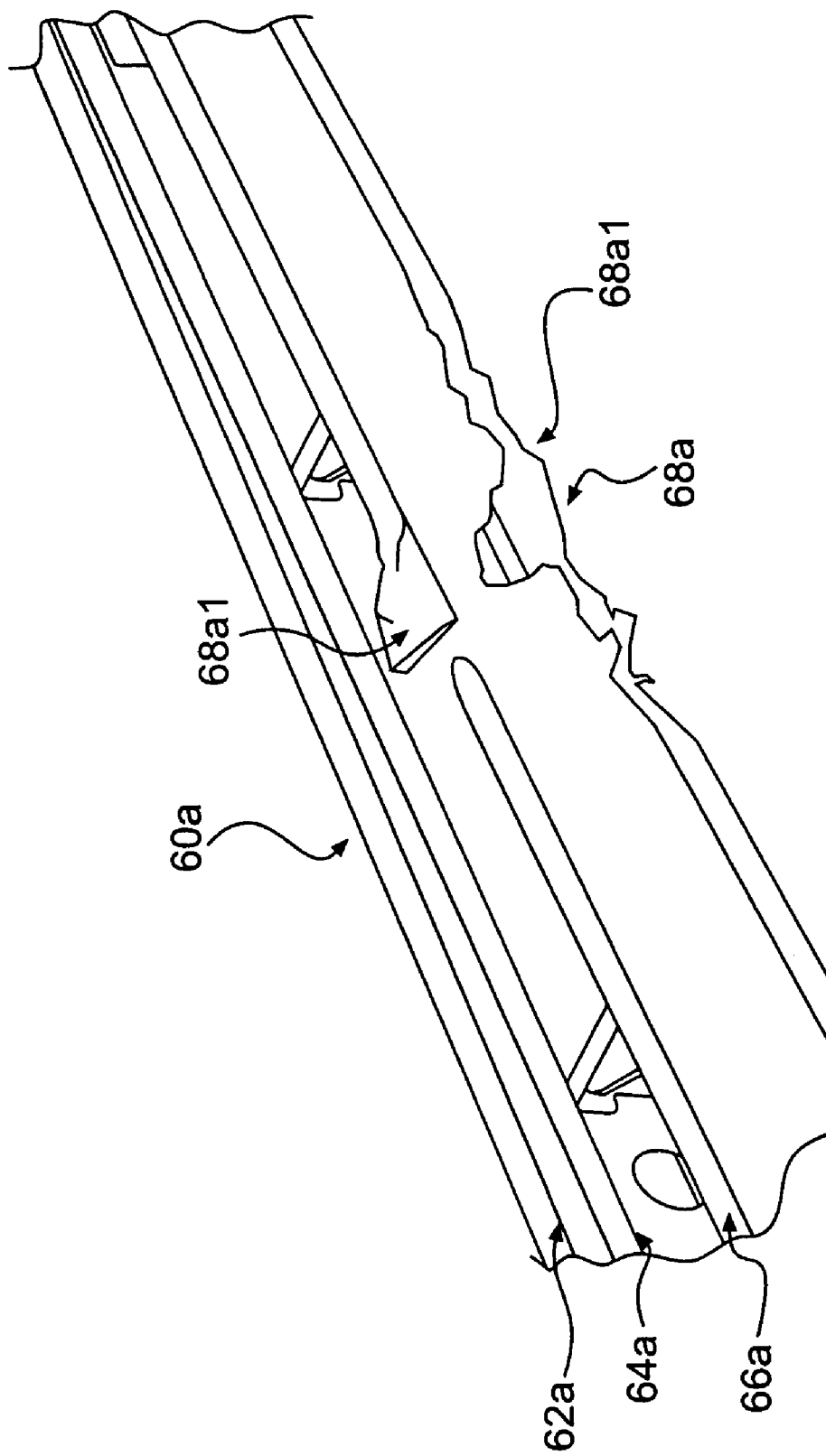

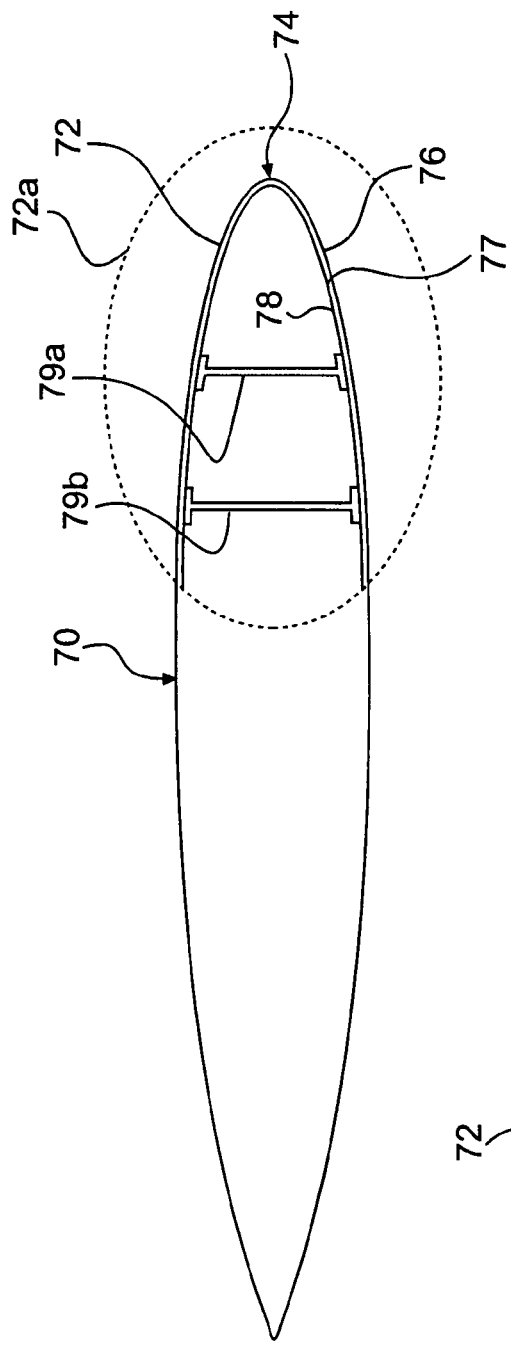
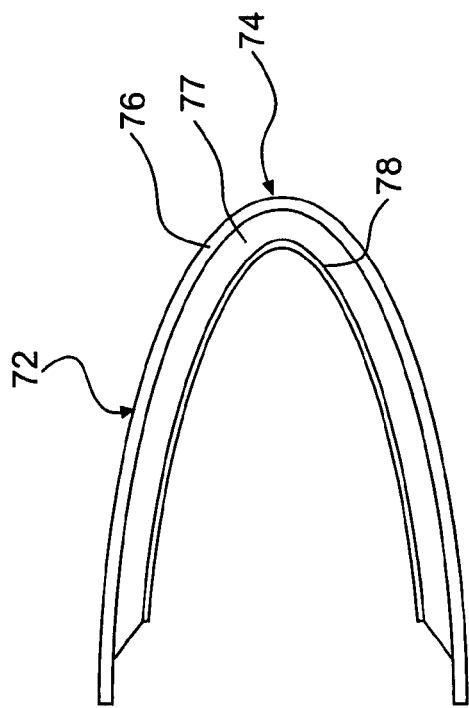
CONVENTIONAL ART
FIG. 4A
CONVENTIONAL ART
FIG. 4B

ENERGY ABSORBING IMPACT BAND AND METHOD

TECHNICAL FIELD

The present disclosure generally relates to energy absorbing impact apparatus and methods to minimize damage incurred for impact events. More particularly, the disclosure pertains to energy absorbing impact members, or bands, and methods to minimize damage from high velocity impact events, such as projectile impacts, including, for example, bird impacts, with an aircraft.

BACKGROUND

Aircraft are susceptible to high velocity impact events with birds, or bird strikes. To reduce the damage and effects of impacts, certain parts or areas of aircraft, such as those with blunt leading edges, for example, wings and stabilizers of the aircraft, are designed and/or sized to withstand such an impact event to assure safety of flight.

Referring to FIGS. 4A and 4B, for example, FIG. 4A is a perspective cross section of a conventional wing arrangement 70 and FIG. 4B is a perspective cross section of the leading edge 72 of the conventional wing arrangement 70 of FIG. 4A, with an apex of the leading edge 72 being designated by the numeral 74. The conventional wing arrangement 70 of FIG. 4A can include an outer face sheet 76, a core 77 and an inner face sheet 78 of suitable material. The conventional wing arrangement 70 also can include exemplary first and second spars 79a and 79b, respectively, with the portion of the wing arrangement 70 including the leading edge 72 and the first and second spars 79a and 79b being indicated by the ellipse 72a, the ellipse 72a also indicating the area of the leading edge 72.

Prior approaches to address reducing the damage and effects of impacts typically involved the thickening of structure, such as one or more of the inner face sheet 78 and the outer face sheets 76 or the core 77, or the addition or sizing of secondary structure, such as one or more spars, such as the spars 79a and 79b, to the aircraft wings. However, thickening or addition of structure for the purpose of preventing damage to critical structure or systems components results in an increase of the weight of the structure, as well as an increase in weight of the aircraft. Moreover, the additional weight, while addressing the effects of potential impacts, can add to the manufacturing and operating costs of the aircraft or other vehicle.

The geometry of the leading edge, such as a leading edge of a wing or stabilizer, typically has significant curvature. Impacts that are away from the apex of the leading edge have a tendency to be re-directed, thus potentially imparting less damage to the leading edge or subsequent structure behind the leading edge.

Accordingly, it is desirable to provide a method and apparatus capable of overcoming the disadvantages described herein at least to some extent.

SUMMARY

The foregoing needs are met, to a great extent, by the present disclosure, wherein, in one respect, apparatus, systems and methods are provided that beneficially resist projectile impacts, such as bird or debris impacts, but without the significant weight penalties that can be associated with conventional sizing methods.

The present disclosure provides various benefits related to improving tolerance to projectile impacts, such as bird or debris impacts. One benefit associated with the disclosure is providing an increased tolerance with less of a weight penalty to reduce the overall weight of the air, or other type, vehicle, which can provide improved efficiency throughout the service life of the air, or other type, vehicle. Another benefit, among others, is stopping the projectile, such as a bird or debris, sooner and allowing less penetration into the structure, which will facilitate simpler repairs and reduced repair costs in the event of an impact.

The energy absorbing impact member, or "bird-band", such as a wire, band, tubular structure, composite structure, or other suitable configuration or structure, according to aspects of the present disclosure, enables deflecting a projectile, such as a bird or debris, upon impact, and absorbing the energy of the impact through deformation and redistributing the load into the surrounding structure. The energy absorbing impact member, according to aspects of the present disclosure, can enable the projectile, such as a bird or debris, to break up and spread out, thus increasing the impacted surface area and reducing subsequent damage from the impact.

Additionally, when integrated into a leading edge structure, the energy absorbing impact member, according to aspects of the present disclosure, enables distribution of the impact load along the leading edge, absorbing more of the projectile's energy, with the energy absorbing impact member typically deforming plastically to minimize damage from the impact to the subsequent portions of the structure behind the leading edge.

According to aspects of the present disclosure, placing an energy absorbing impact member, such as a strip of high strength/high strain material, for example, along the apex of the leading edge, damage to the structure can be reduced. Specifically, the energy absorbing impact member enables increased protection of relatively more vulnerable areas of a structure, such as a wing or stabilizer, by causing the projectile, such as a bird or debris, to slow down, such as by converting kinetic energy of the projectile, into a plastic strain and to enable break-up or "splatter" of the projectile prior to impacting the subsequent portions of the structure.

An embodiment of the present disclosure pertains to an energy absorbing apparatus including an impact member of a plastically deformable material of a predetermined configuration, the impact member being positioned with a structure in an area of the leading edge of the structure to absorb energy of an impact of a projectile with the leading edge of the structure and to redistribute the energy of the impact to the structure.

Yet another embodiment of the present disclosure relates to an energy absorbing system including a structure having a leading edge, and an impact member, such as a "bird-band", of a plastically deformable material of a predetermined configuration, the impact member, or "bird-band", being positioned with the structure in an area of the leading edge of the structure to absorb energy of an impact of a projectile with the leading edge of the structure and to redistribute the energy of the impact to the structure. The structure can include a single sheet, a composite single sheet, a plurality of sheets, a plurality of composite sheets, a plurality of sheets with a core between one or more sheets, or other suitable structure, for example, according to aspects of the present disclosure.

A further embodiment of the present disclosure relates to an energy absorbing system including a sheet means for forming a structure having a leading edge, and a means for absorbing an impact positioned with the structure in an area of the leading edge of the structure to absorb energy of an impact of a projectile with the leading edge of the structure and to redistribute the energy of the impact to the structure.

Additionally, another embodiment of the present disclosure relates to an energy absorbing method including forming a structure having a leading edge, and positioning an impact member, such as a "bird-band", of plastically deformable material with the structure in an area of the leading edge of the structure to absorb energy of an impact of a projectile with the leading edge of the structure and to redistribute the energy of the impact to the structure.

There has thus been outlined, rather broadly, certain embodiments that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. In addition to the embodiments described, the various embodiments are capable of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the various embodiments.

BRIEF DESCRIPTION OF THE DRAWINGS

FIG. 2A through 2I are diagrammatic, exemplary cross sectional views to illustrate the leading edge of the various structures of FIGS. 1A through 1C incorporating an energy absorbing impact member according to aspects of the present disclosure.

FIG. 3A and 3B are illustrations of simulations of a horizontal stabilizer for an aircraft, such as the aircraft of FIG. 1A, impacted by a projectile, such as a bird or debris, with the horizontal stabilizer of FIG. 3A incorporating an energy absorbing impact member according to aspects of the present disclosure, and with the horizontal stabilizer of FIG. 3B not incorporating an energy absorbing impact member according to aspects of the present disclosure.

FIG. 4A is a perspective cross section of a conventional wing arrangement including support spars and a leading edge.

FIG. 4B is a perspective cross section of the leading edge of the conventional wing arrangement of FIG. 4A.

DETAILED DESCRIPTION OF THE PREFERRED EMBODIMENTS

Figure 1A:
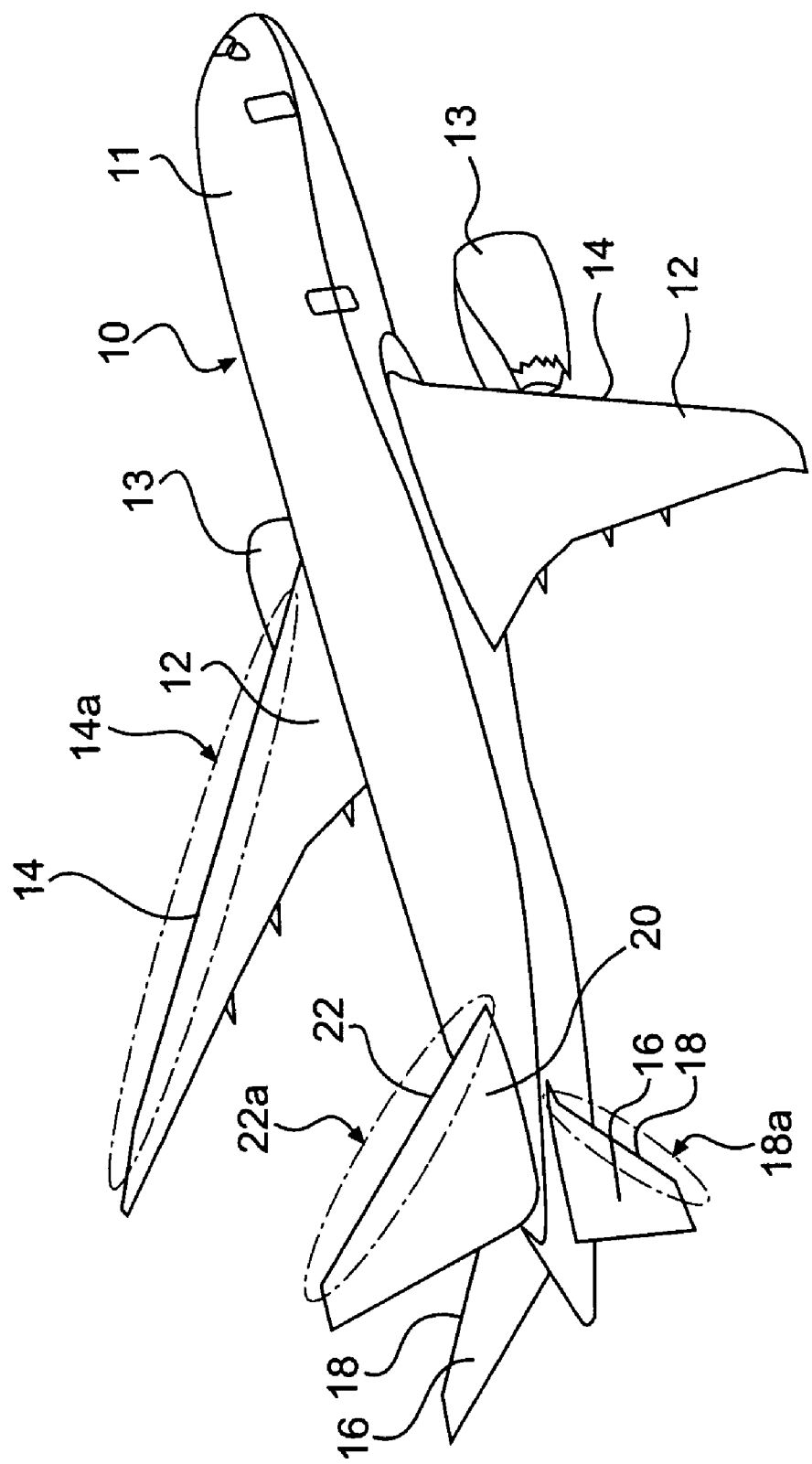
FIG. 1A is a perspective view of an exemplary aircraft illustrating various structures having leading edges, such as the wings, vertical stabilizer and horizontal stabilizers, to which the present disclosure is applicable.

Various embodiments of the present disclosure will now be described with reference to the drawing figures, in which like reference numerals refer to like parts throughout. As shown in FIG. 1A, FIG. 1A is a perspective view of an airplane 10, as an example of a vehicle, such as an aircraft, to which the present disclosure is applicable, illustrating various structures having leading edges, such as wings 12, horizontal stabilizers 16 and vertical stabilizer 20. The airplane 10 also has a body or fuselage 11 to which the wings 12 and the horizontal and vertical stabilizers 16 and 20 are attached. Engines 13 are attached, for example, to the wings 12 of the airplane 10.

The wings 12 of the exemplary airplane 10 have a respective leading edge 14 that extends along the area indicated by the ellipse 14a. Also, the horizontal stabilizers 16 of the airplane 10 have a respective leading edge 18 that extends along the area indicated by the ellipse 18a. Additionally, the vertical stabilizer 20 of the exemplary airplane 10 has a corresponding leading edge 22 that extends along the area indicated by the ellipse 22a.

Figure 1B:
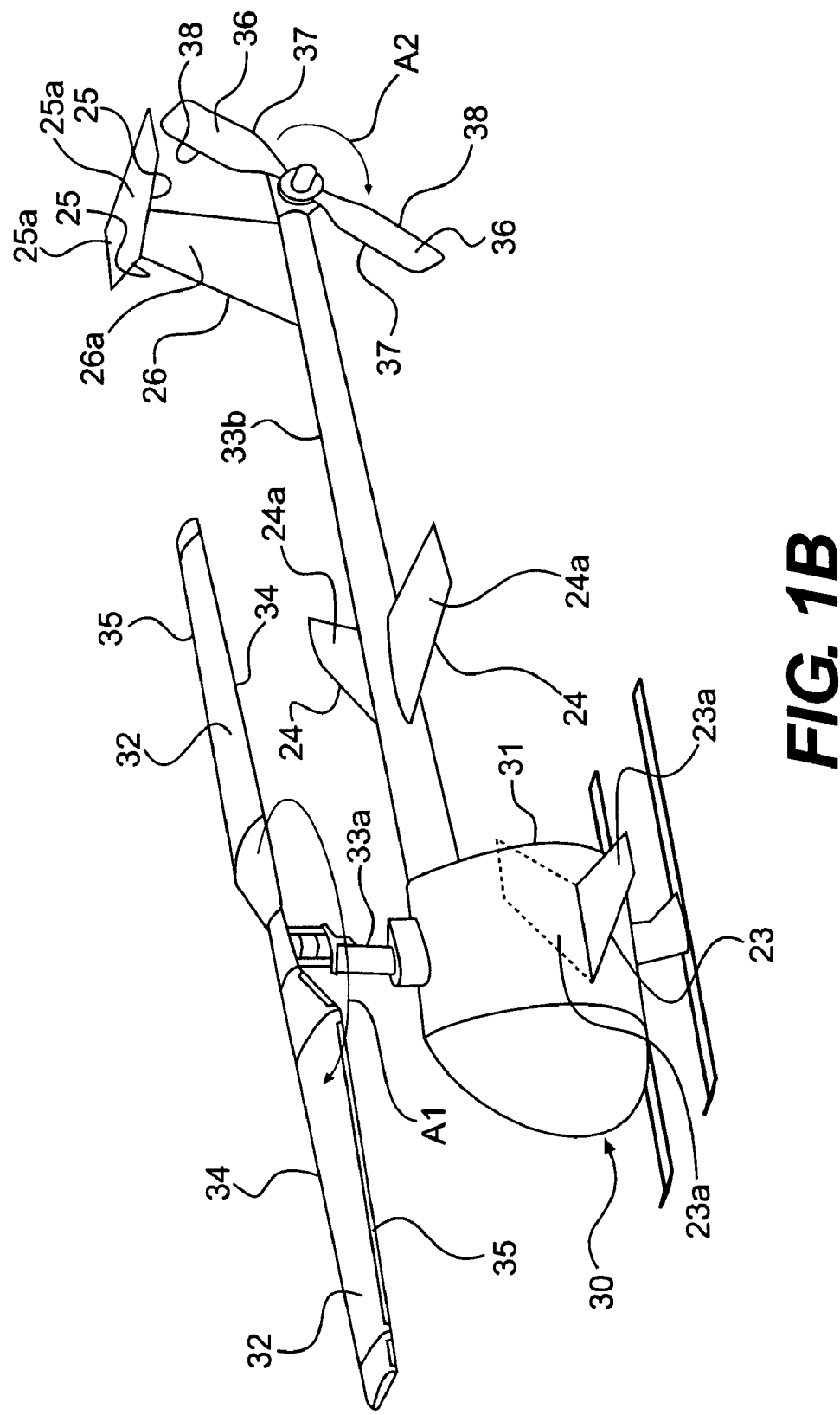
FIG. 1B is a perspective view of a helicopter, as an exemplary aircraft, illustrating rotor blades, horizontal and vertical stabilizers, and payload wings as structures having leading edges to which the present disclosure is applicable.

Continuing with reference to FIG. 1B, FIG. 1B is a perspective view of a helicopter 30, as another exemplary aircraft, illustrating main rotor blades 32, tail rotor blades 36, payload wings 23a (for carrying cargo or for lift), horizontal stabilizers 24a and 25a, and vertical stabilizer 26a as exemplary structures having leading edges to which the present disclosure is applicable. The main rotor blades 32 have a respective a leading edge 34 and a respective trailing edge 35, referenced from a clockwise rotation direction for the blades 32 indicated by the circular arrow headed line A1, for example. Also, the tail rotor blades 36 have a respective a leading edge 37 and a respective trailing edge 38, referenced from a clockwise rotation direction for the blades 36 indicated by the circular arrow headed line A2, for example. The helicopter can also include one or more of the payload wings 23a having leading edges 23, the horizontal stabilizers 24a having leading edges 24, the horizontal stabilizers 25a having leading edges 25, and the vertical stabilizer 26a having leading edge 26, for example. The helicopter 30 also has a body 31 that supports a main rotor assembly 33a that communicates with the main rotor blades 32. The body 31 also supports a tail rotor assembly 33b that extends from the body 31 and communicates with the tail rotor blades 36.

Figure 1C:
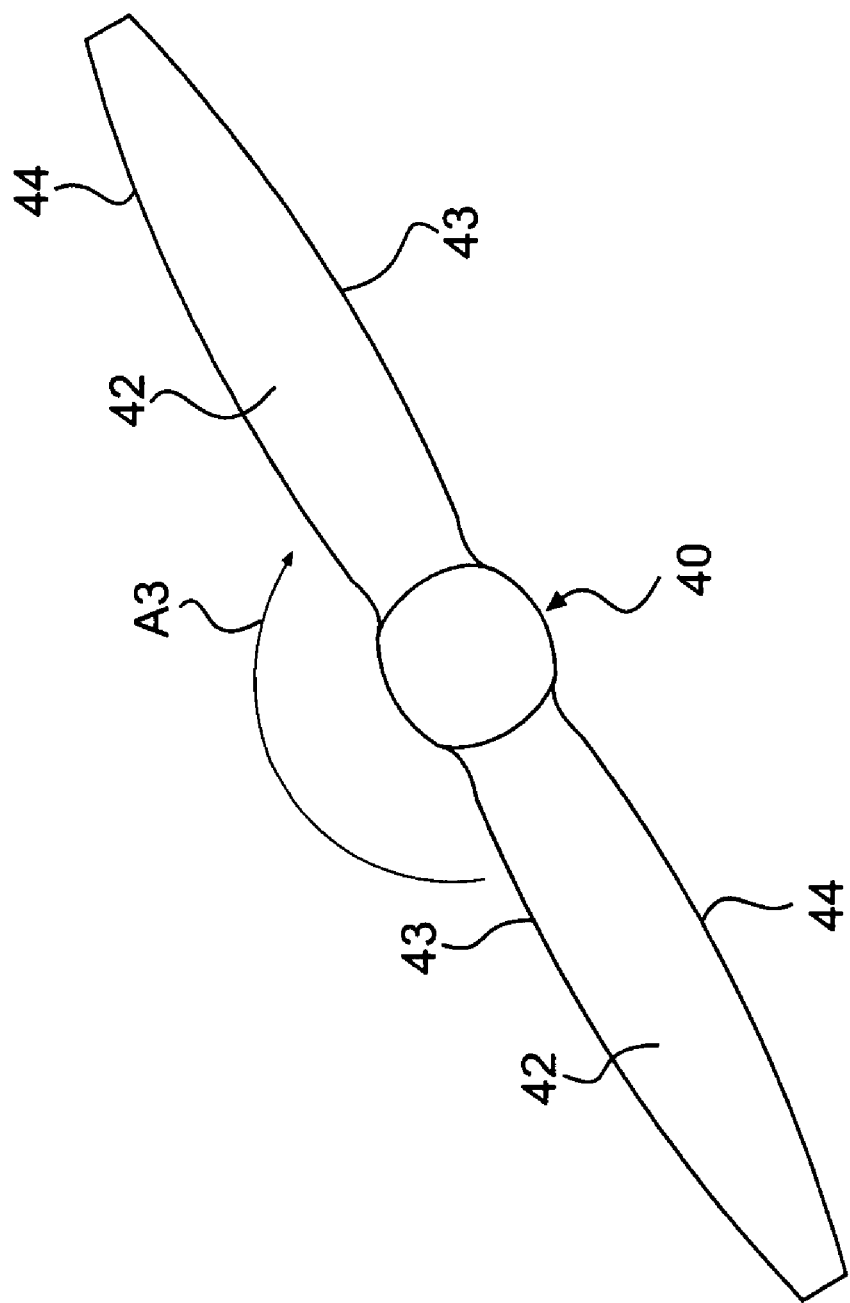
FIG. 1C is a perspective view illustrating exemplary propeller blades for a vehicle, such as an aircraft, as structures having leading edges to which the present disclosure is applicable.

Referring now to FIG. 1C, FIG. 1C is a perspective view illustrating an exemplary propeller 40 having blades 42 for a vehicle, such as an aircraft, hovercraft, or other propeller driven vehicle or device, as an exemplary structure having leading edges to which the present disclosure is applicable. The propeller blades 42 have a respective a leading edge 43 and a respective trailing edge 44, referenced from a clockwise rotation direction for the propeller blades 42 indicated by the circular arrow headed line A3, for example. As evident from the various vehicles identified with reference to FIGS. 1A through 1C, while aircraft, such as the airplane 10 and the helicopter 30, are example of vehicles to which the present disclosure is applicable, the present disclosure is not limited in this regard.

FIG. 2A through 2I are diagrammatic, exemplary cross sectional views illustrating leading edges 50a through 50i of the various structures of FIGS. 1A through 1C, or other structures, incorporating an energy absorbing impact member according to aspects of the present disclosure. In FIGS. 2A through 2I, cross sections of leading edges 50a through 50i, such as the leading edges 14, 18, 22 through 26, 34, 37, and 43 of the wings 12, horizontal stabilizers 16, vertical stabilizer 20, payload wings 23a, horizontal stabilizers 24a and 25a, vertical stabilizer 26a, main rotor blades 32, tail rotor blades 36, and propeller blades 42, respectively, illustrate various embodiments of the present disclosure, although the present disclosure is not limited in this regard. Also, while the leading edge cross sections 50a through 50i, are primarily directed to illustrate the present disclosure for incorporation in airplane wings and stabilizers, they are also illustrative for other applications of the present disclosure, such as for incorporation in blades or propellers, for various other vehicles that move through or on the air, water, or land, or other propeller driven devices.

In this regard, for example, the energy absorbing impact members and methods of the present disclosure can be applied to aircraft nose cones, such as to minimize damage or breach of the cabin by a projectile. Also the energy absorbing impact members and methods of the present disclosure can be applied to watercraft, such as hydrofoils, catamarans, or boat hulls, such as to minimize damage from projectiles, such as logs or other debris, or can be applied to submarines or other submersible craft, such as to minimize damage to control surfaces. Further, for example, the energy absorbing impact members and methods of the present disclosure can be applied to windmill blades, such as to minimize damage by a projectile impact, such as by a bird.

The exemplary cross sections of the leading edges 50a through 50i, such as leading edges 14, 18 and 22 have areas 51a through 51i in which energy absorbing impact members, or "bird bands", 53a through 53i2, according to aspects of the present disclosure, can be positioned. The energy absorbing impact members 53a through 53i2 can be positioned selectively, variably, continuously, intermittently or periodically along the length, or course, of the leading edge, such as within the areas 51a through 51i of the leading edges 50a through 50i, of various structures, such as the leading edges 14, 18 and 22, for example, depending upon the particular use or application, according to aspects of the present disclosure, although the present disclosure is not limited in this regard.

Also, the energy absorbing impact members 53a through 53i2 can be of any suitable shape or configuration, dependent upon the particular use or application, such as of a generally "C" shape or generally parabolic shape illustrated in FIGS. 2A through 2I, or other suitable configuration, although the present disclosure is not limited in this regard. The width, thickness and curvature of the strip, piece or pieces forming one or more energy absorbing impact members 53a through 53i2 can be tailored for a particular application, such as taking into account the curvature of the leading edge, pre-existing structural and aerodynamic sizing, and a projectile, such as bird or debris, strike requirement to create the optimal, or suitable, design, typically by analysis and/or testing. Additionally, the energy absorbing impact member, such as the energy absorbing impact members 53a through 53i2 can be integrated into new leading edge designs, or used as an improvement on existing leading edges, such as to provide additional bird strike resistance capabilities.

The energy absorbing impact members 53a through 53i2 improve the bird, or other projectile, strike resistance of a structure, such as an aircraft, or other structure, susceptible to high energy impacts from projectiles, such as birds or debris, or other types of projectiles. The energy absorbing impact members, or "bird-bands", 53a through 53i2 can be formed of a strip, piece or pieces of one or more configurations of high strength/high strain material positioned with a structure in the area 51a through 51i of the leading edge, such as the leading edges 14, 18 and 22 of wings 12 or stabilizers 16, 20, which typically are relatively more vulnerable to bird, or other projectile, strikes or impacts.

The energy absorbing impact members 53a through 53i2 can also be positioned with a structure in the area 51a through 51i of the leading edge, such as the leading edges 23 through 26, 34, 37, and 43, of payload wings 23a, horizontal stabilizers 24a and 25a, vertical stabilizer 26a, main rotor blades 32, the tail rotor blades 36 or the propeller blades 42, which can also be susceptible to projectile, such as bird, debris, or other projectile, strikes or impacts. However, placement of the energy absorbing impact members, such as energy absorbing impact members 53a through 53i2, positioned with, such as on or within a structure, such as wing or stabilizer, is typically a function of bond strength, structural configuration and manufacturing considerations, according to aspects of the present disclosure.

Alloys such as 301% hardened and 314 annealed stainless steels are typically highly suitable materials for energy absorbing impact members 53a through 53i2. However, other high strength/high strain materials (metallic, composite, or other), alloys, such as nickel alloys, titanium alloys or steel alloys (non-stainless), or plastic type materials, such as KEVLAR®, are suitable, with varied amount and type of benefit, for the composition of the energy absorbing impact members 53a through 53i2, depending on the use, application or protection level, according to aspects of the present disclosure.

The outer face sheet 52a through 52e and 52g through 52i and the inner face sheet 56a through 56e and 56g through 56i, and the single sheet 52f are typically formed of aluminum alloys, or a suitable composite material, such as of fiberglass, for example. Further, a core, to provide face sheet stability, such as cores 54a through 54e and 54g through 54i, can be sandwiched between all or portions of the outer face sheet 52a through 52e and 52g through 52i and all or portions of the inner face sheet 56a through 56e and 56g through 56i. The core, such as cores 54a through 54e and 54g through 54i, is typically affixed to the outer face sheet 52a through 52e and 52g through 52i and the inner face sheet 56a through 56e and 56g through 56i, such as by a suitable glue or adhesive. The core 54a through 54e and 54g through 54i is typically formed of a lightweight material and of a honeycomb type structure or other suitable type structure, such as formed of aluminum alloys, titanium alloys, foam, NOMEX®, or other suitable material.

The energy absorbing impact members, or "bird-bands", 53a through 53i2 can be positioned with the leading edges, such as leading edges 14, 18 and 22, by being bonded or affixed, as by being adhesively bonded with an adhesive, such as an epoxy or other suitable adhesive, or as by being affixed, such as by rivets or other suitable fasteners, to one or more surfaces, such as the inner or outer surfaces, of the leading edge. Also, the energy absorbing impact members, or "bird-bands", 53a through 53i2 can be positioned with the leading edges, such as leading edges 14, 18 and 22, by being integrated or embedded within a sheet member, such as within a laminate or within the plies of a composite material, forming a structure.

Referring first to FIGS. 2A through 2D, for example, as illustrated in FIGS. 2A through 2D, the energy absorbing impact members 53a through 53d are positioned with the leading edges, such as leading edges 14, 18 and 22, by being adhesively bonded or secured, for example, to a surface of the outer face sheet 52a and 52b, respectively, or to a surface of the inner face sheet 56c and 56d, respectively.

Referring to FIG. 2A, in the cross section of the leading edge 50a, such as leading edges 14, 18 and 22, the leading edge 50a is formed by a plurality of sheet members including the outer face sheet 52a having an outer surface 52a1 and an inner surface 52a2 and the inner face sheet 56a having an outer surface 56a1 and an inner surface 56a2. The inner face sheet 56a of FIG. 2A includes two portions 56ap1 and 56ap2 that are separated from each other in the apex 51a of the area 50a1 of the leading edge 50a. The area 50a1 is the area including and within the entire leading edge 50a. The core 54a within the area 50a1 of the leading edge 50a is sandwiched and affixed between the inner surface 52a2 of the outer face sheet 52a and the outer surface 56a1 of corresponding portions 56ap1 and 56ap2 of the inner face sheet 56a, with the core 54a and the inner face sheet 56a not being included within the apex 51a of the area 50a1 of the leading edge 50a, as illustrated in FIG. 2A. The energy absorbing impact member 53a is positioned with the structure by being adhesively secured, or otherwise affixed, to the inner surface 52a2 of the outer face sheet 52a within the apex 51a of the area 50a1 of the leading edge 50a, although the present disclosure is not limited in this regard. Also, the embodiment of the leading edge 50a of FIG. 2A illustrates an example of a single sheet member embodiment, according to aspects of the present disclosure, by removing the two portions 56ap1 and 56ap2 of the inner face sheet 56a and the core 54a, providing a structure for the leading edge 50a that includes the outer face sheet 52a, as a single sheet member, positioned with the energy absorbing impact member 53a.

Further, referring to FIG. 2B, for example, in the cross section of the leading edge 50b, such as leading edges 14, 18 and 22, the leading edge 50b is formed by a plurality of sheet members including the outer face sheet 52b having an outer surface 52b1 and an inner surface 52b2 and the inner face sheet 56b having an outer surface 56b1 and an inner surface 56b2. The core 54b within the area 50b1 of the leading edge 50b is sandwiched and affixed between the inner surface 52b2 of the outer face sheet 52b and the outer surface 56b1 of the inner face sheet 56b. The area 50b1 is the area including and within the entire leading edge 50b. The energy absorbing impact member 53b is positioned with the structure by being adhesively secured, or otherwise affixed, to the inner surface 52b2 of the outer face sheet 52b adjacent the core 54b within the apex 51b of the area 50b1 of the leading edge 50b, although the present disclosure is not limited in this regard.

Continuing with reference to FIG. 2C, for example, in the cross section of the leading edge 50c, such as leading edges 14, 18 and 22, the leading edge 50c is formed by a plurality of sheet members including the outer face sheet 52c having an outer surface 52c1 and an inner surface 52c2 and the inner face sheet 56c having an outer surface 56c1 and an inner surface 56c2. The core 54c within the area 50c1 of the leading edge 50c is sandwiched and affixed between the inner surface 52c2 of the outer face sheet 52c and the outer surface 56c1 of the inner face sheet 56c. The area 50c1 is the area including and within the entire leading edge 50c. The energy absorbing impact member 53c is positioned with the structure by being adhesively secured, or otherwise affixed, to the inner surface 56c2 of the inner face sheet 56c within the apex 51c of the area 50c1 of the leading edge 50c, although the present disclosure is not limited in this regard.

Also, referring to FIG. 2D, for example, in the cross section of the leading edge 50d, such as leading edges 14, 18 and 22, the leading edge 50d is formed by a plurality of sheet members including the outer face sheet 52d having an outer surface 52d1 and an inner surface 52d2 and the inner face sheet 56d having an outer surface 56d1 and an inner surface 56d2. The core 54d within the area 50d1 of the leading edge 50d is sandwiched and affixed between the inner surface 52d2 of the outer face sheet 52d and the outer surface 56d1 of the inner face sheet 56d. The area 50d1 is the area including and within the entire leading edge 50d. The energy absorbing impact member 53d is positioned with the structure by being adhesively secured, or otherwise affixed, to the outer surface 56d1 of the inner face sheet 56d adjacent the core 54d within the apex 51d of the area 50d1 of the leading edge 50d, although the present disclosure is not limited in this regard.

Figure 2E:
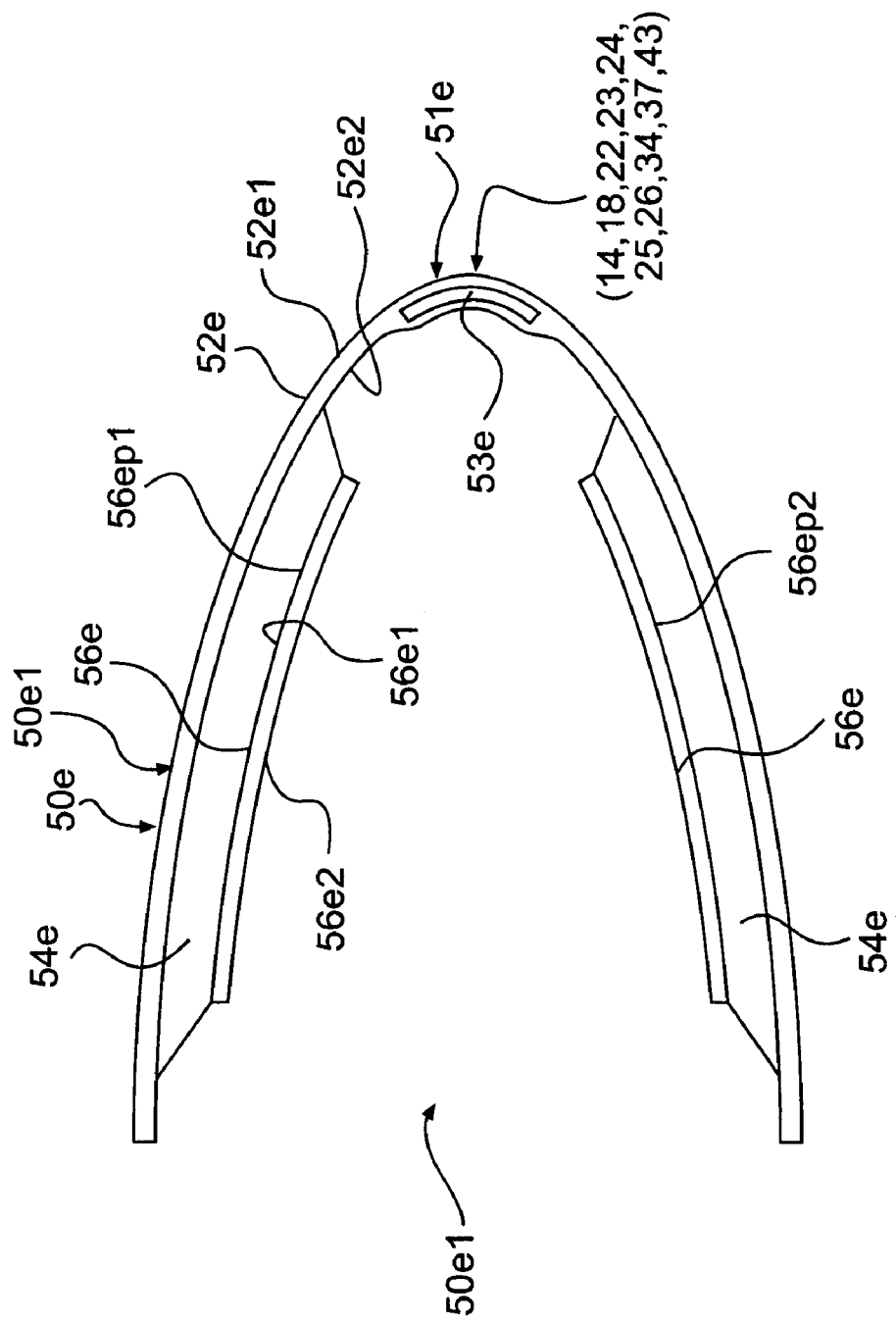
Figure 2G:
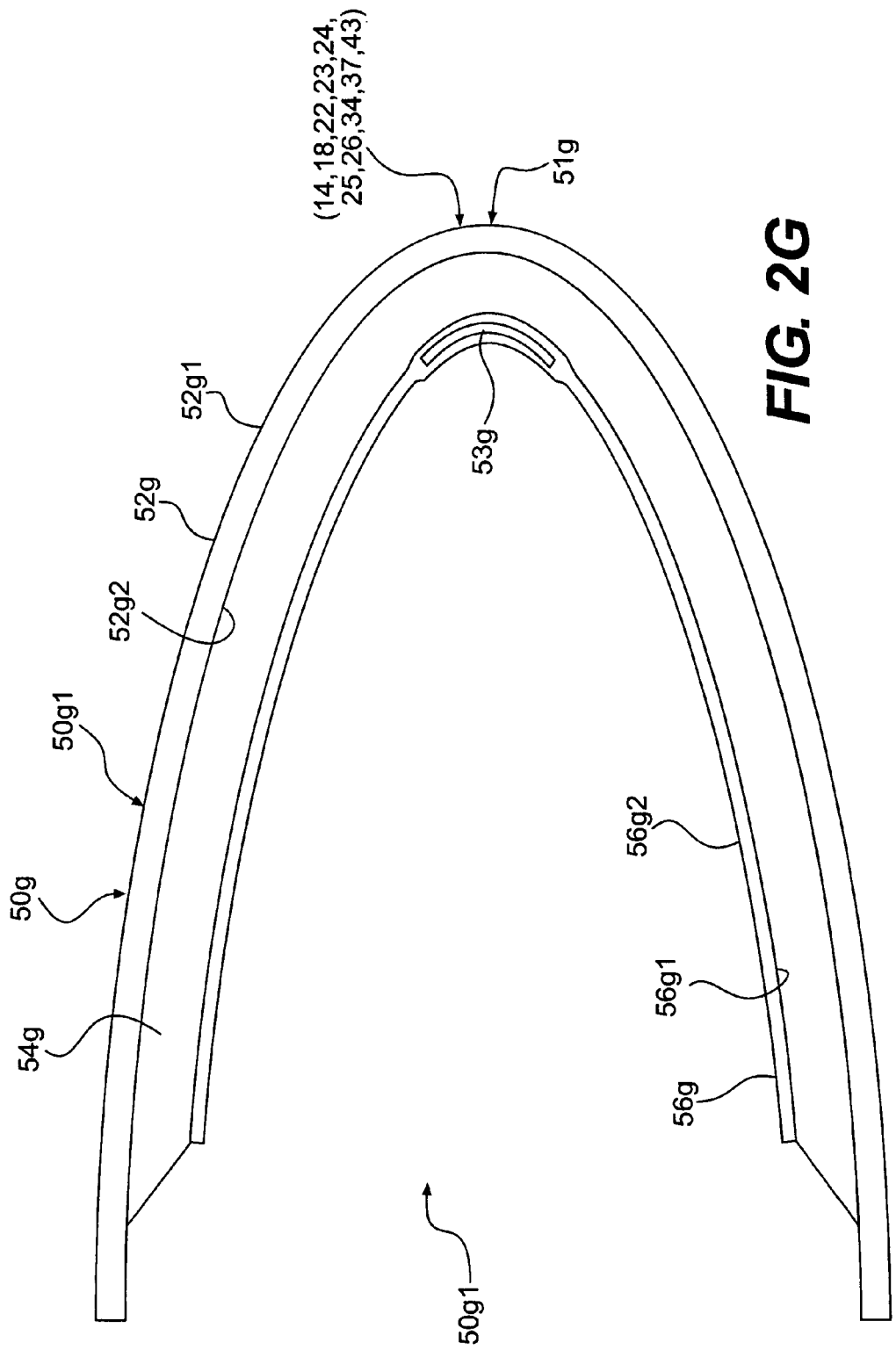
Figure 2I:
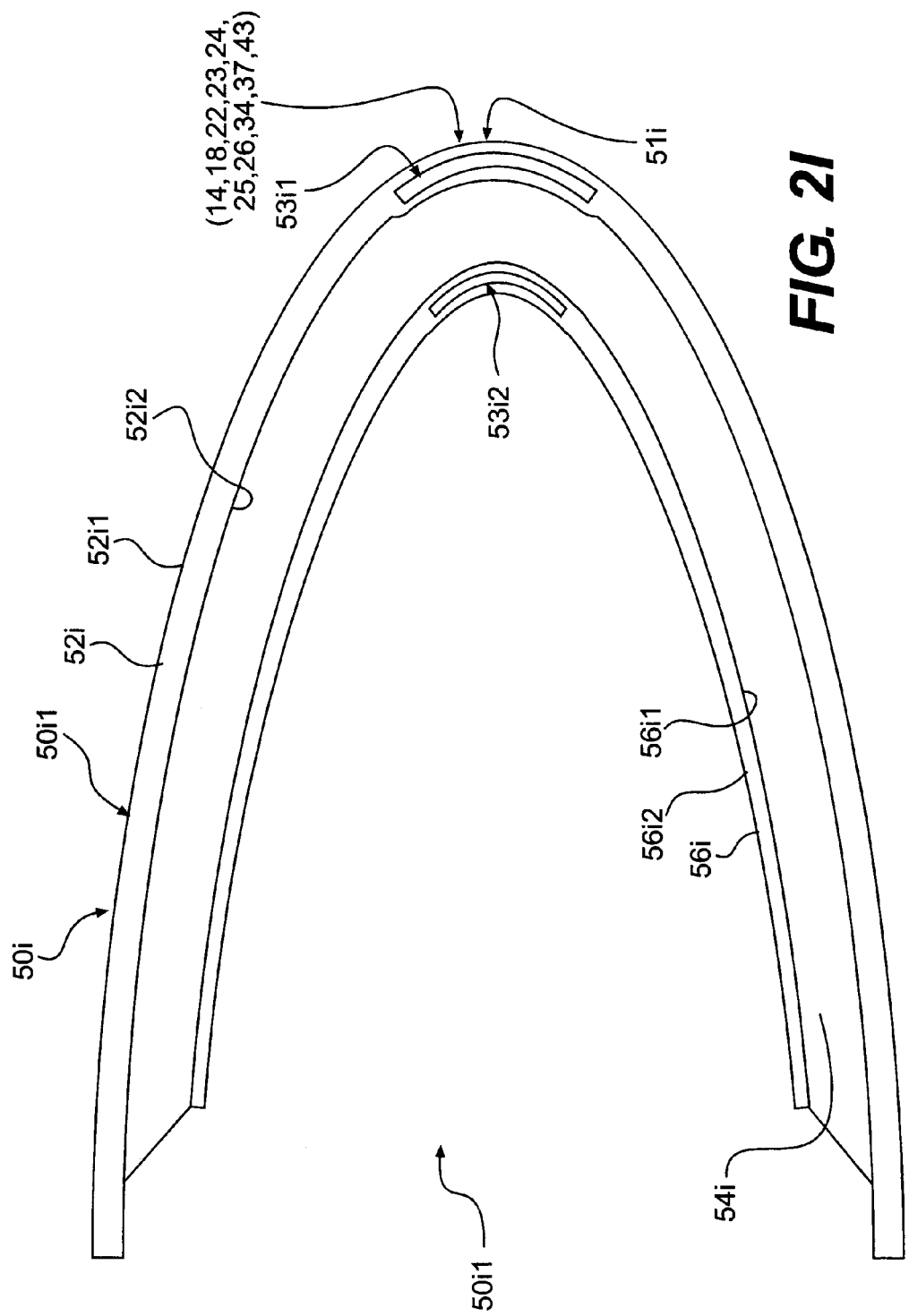

Referring now to FIGS. 2E through 2I, for composite leading edges, such as leading edges 14, 18 and 22, the energy absorbing impact members, or "bird-bands", can also be positioned with a structure by being integrated with the structure, such as by being embedded within a laminate forming the structure. The energy absorbing impact member can be embedded within a laminate forming the outer face sheet, such as illustrated in FIGS. 2E and 2H. The energy absorbing impact member can be embedded within a laminate forming a single sheet, such as illustrated in FIG. 2F. The energy absorbing impact member can be embedded within a laminate forming the inner face sheet, such as illustrated in FIG. 2G. The energy absorbing impact member can also be embedded both within a laminate forming the inner face sheet and within a laminate forming the outer face sheet, such as illustrated in FIG. 2I, according to aspects of the present disclosure, although the present disclosure is not limited in this regard. For example, the energy absorbing impact members 53e through 53i2 can be sandwiched between plies of a composite material, such as fiberglass or other suitable composite material.

Referring to FIG. 2E, in the cross section of the leading edge 50e, such as leading edges 14, 18 and 22, the leading edge 50e is formed by a plurality of sheet members including the outer face sheet 52e having an outer surface 52e1 and an inner surface 52e2 and the inner face sheet 56e having an outer surface 56e1 and an inner surface 56e2. The inner face sheet 56e of FIG. 2E includes two portions 56ep1 and 56ep2 that are separated from each other within the apex 51e of the area 50e1 of the leading edge 50e. The core 54e within the area 50e1 of the leading edge 50e is sandwiched and affixed between the inner surface 52e2 of the outer face sheet 52e and the outer surface 56e1 of corresponding portions 56ep1 and 56ep2 of the inner face sheet 56e, with the core 54e not being included within the apex 51e of the area 50e1 of the leading edge 50e. The area 50e1 is the area including and within the entire leading edge 50e. The energy absorbing impact member 53e is positioned with the structure by being integrated with the structure by being embedded within the laminate, such as within the plies of the composite material, within the outer face sheet 52e in the apex 51e of the area 50e1 of the leading edge 50e.

Continuing with reference to FIG. 2F, for example, in the cross section of the leading edge 50f, such as leading edges 14, 18 and 22, the leading edge 50f is formed by a sheet member including a single sheet 52f having an outer surface 52f1 and an inner surface 52f2 The energy absorbing impact member 53f is positioned with the structure by being integrated with the structure by being embedded within a laminate, such as within the plies of a composite material, within the single sheet 52f within the apex 51f of the area 50f1 of the leading edge 50f, although the present disclosure is not limited in this regard. The area 50f1 is the area including and within the entire leading edge 50f.

Also, referring to FIG. 2G, for example, in the cross section of the leading edge 50g, such as leading edges 14, 18 and 22, the leading edge 50g is formed by a plurality of sheet members including the outer face sheet 52g having an outer surface 52g1 and an inner surface 52g2 and the inner face sheet

56*g* having an outer surface 56*g*1 and an inner surface 56*g*2. The core 54*g* within the area 50*g*1 of the leading edge 50*g* is sandwiched and affixed between the inner surface 52*g*2 of the outer face sheet 52*g* and the outer surface 56*g*1 of the inner face sheet 56*g*. The area 50*g*1 is the area including and within the entire leading edge 50*g*. The energy absorbing impact member 53*g* is positioned with the structure by being integrated with the structure by being embedded within a laminate, such as within the plies of a composite material, within the inner face sheet 56*g* within the apex 51*g* of the area 50*g*1 of the leading edge 50*g*, although the present disclosure is not limited in this regard.

Further, referring to FIG. 2H, for example, in the cross section of the leading edge 50*h*, such as leading edges 14, 18 and 22, the leading edge 50*h* is formed by a plurality of sheet members including the outer face sheet 52*h* having an outer surface 52*h*1 and an inner surface 52*h*2 and the inner face sheet 56*h* having an outer surface 56*h*1 and an inner surface 56*h*2. The core 54*h* within the area 50*h*1 of the leading edge 50*h* is sandwiched and affixed between the inner surface 52*h*2 of the outer face sheet 52*h* and the outer surface 56*h*1 of the inner face sheet 56*h*. The area 50*h*1 is the area including and within the entire leading edge 50*h*. The energy absorbing impact member 53*g* is positioned with the structure by being integrated with the structure by being embedded within a laminate, such as within the plies of a composite material, within the outer face sheet 52*h* within the apex 51*h* of the area 50*h*1 of the leading edge 50*h*, although the present disclosure is not limited in this regard.

Continuing with reference to FIG. 2I, for example, in the cross section of the leading edge 50*i*, such as leading edges 14, 18 and 22, the leading edge 50*i* is formed by a plurality of sheet members including the outer face sheet 52*i* having an outer surface 52*i*1 and an inner surface 52*i*2 and the inner face sheet 56*i* having an outer surface 56*i*1 and an inner surface 56*i*2. The core 54*i* within the area 50*i*1 of the leading edge 50*i* is sandwiched and affixed between the inner surface 52*i*2 of the outer face sheet 52*i* and the outer surface 56*i*1 of the inner face sheet 56*i*. The area 50*i*1 is the area including and within the entire leading edge 50*i*. In FIG. 2I, a plurality of energy absorbing impact members 53*i*1 and 53*i*2 are illustrated. The energy absorbing impact member 53*i*1 is positioned with the structure by being integrated with the structure by being embedded within a laminate, such as within the plies of a composite material, within the outer face sheet 52*i* within the apex 51*i* of the area 50*i*1 of the leading edge 50*i*. The energy absorbing impact member 53*i*2 is positioned with the structure by being integrated with the structure by being embedded within a laminate, such as within the plies of a composite material, within the inner face sheet 56*i* within the apex 51*i* of the area 50*i*1 of the leading edge 50*i*, although the present disclosure is not limited in this regard.

Thus, according to aspects of the present disclosure, protecting a relatively small portion of the leading edge, such as within the apex of the area of the leading edge, with the energy absorbing impact member(s), or "bird-band(s)", 53*a* through 53*i*2, enables an increased level of protection to be concentrated in a relatively critical area of the structure, while substantially reducing or minimizing a weight penalty associated with providing the enhanced level of protection.

Also, according to aspects of the present disclosure, in view of the reduced coverage area for the energy absorbing impact member, or "bird-band", to provide an increased level of protection, a denser but higher strength, higher strain material, such as various stainless steels, for example, can be used to form the energy absorbing impact member, or "bird-band". Moreover, there is an added benefit of utilizing a ductile material for the energy absorbing impact member, or "bird-band", according to aspects of the present disclosure. In this regard, typically aircraft materials are high stiffness/high strength materials with minimal ductility. Providing an energy absorbing impact member of a material with significant plastic deformation capability can increase the energy absorption characteristics of the structure, as well as reducing or minimizing potentially damaging kinetic energy of the impact by the projectile, such as a bird or debris.

Finite element analysis by simulating bird impacts while utilizing the energy absorbing impact member, or "bird-band", according to aspects of the present disclosure, have shown a significant improvement in projectile strike resistance, such as bird strike resistance, with a minimal weight effect on the structure. Further, use of an energy absorbing impact member, or "bird-band", such as a stainless steel impact member, or "bird-band", is typically lighter, thereby minimizing a weight penalty, and also relatively more effective than increasing the gage of the first and second spars 79*a* and 79*b* (FIG. 4A) for stopping the penetration of a projectile, such as a bird or debris, into the horizontal and vertical stabilizer structures, for example. However, actual weight benefit of the energy absorbing impact member, or "bird-band", according to aspects of the present disclosure, typically depends on the specific application.

Figure 3B:
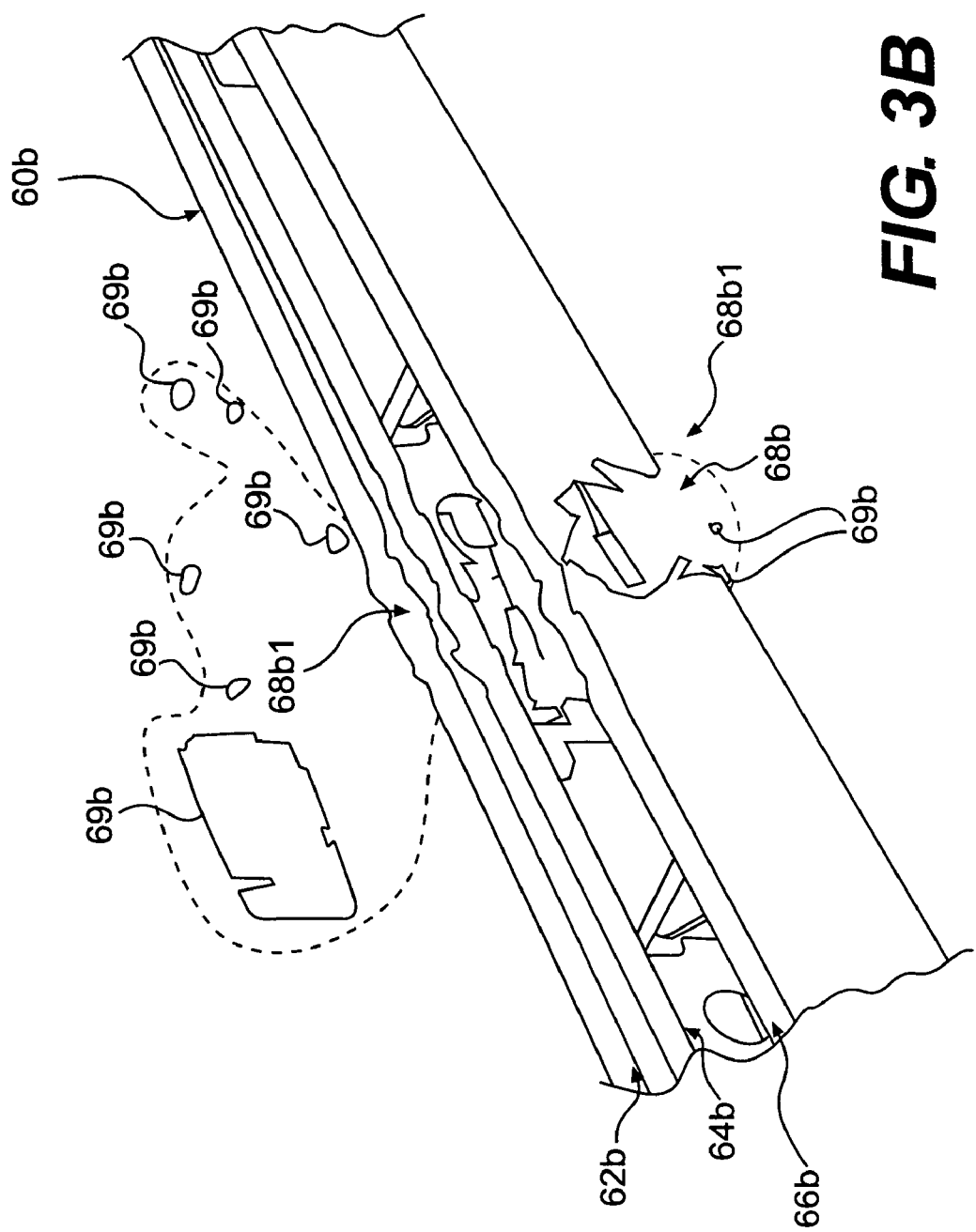

FIG. 3A and 3B are illustrations of simulations of a horizontal stabilizer for an aircraft, such as the aircraft of FIG. 1A, impacted by a projectile, such as a bird or debris, with the horizontal stabilizer of FIG. 3A incorporating an energy absorbing impact member, or "bird-band", according to aspects of the present disclosure, and with the horizontal stabilizer of FIG. 3B not incorporating an energy absorbing impact member, or "bird-band", according to aspects of the present disclosure. The simulated impact analyses illustrated in FIGS. 3A and 3B were performed using the LS-DYNA finite element software package. The simulated analyses of FIGS. 3A and 3B were also performed based upon an 8 lb bird, as the projectile, impacting the horizontal stabilizer of an aircraft at a speed of 350 knots.

FIG. 3A illustrates a simulation of an impact with a horizontal stabilizer 60*a* such as for the airplane 10 of FIG. 1A, incorporating an energy absorbing impact member, or "bird-band", according to aspects of the present disclosure. The horizontal stabilizer 60*a* includes a first spar 66*a*, a second spar 64*a* and a third spar 62*a*. The simulated area of impact is indicated by 68*a* with the damage from the impact indicated by 68*a*1. For the simulated analysis, a 20% thinner first spar 66*a* was used to offset the weight penalty of incorporating the energy absorbing impact member, or "bird-band", according to aspects of the present disclosure. Running the simulation on the structure of FIG. 3A, the horizontal stabilizer 60*a* with the 20% thinner first spar 66*a*, and incorporating the energy absorbing impact member, or "bird-band", according to aspects of the present disclosure, showed no visible damage or penetration of the second spar 64*a* and the third spar 62*a*.

FIG. 3B illustrates a simulation of an impact with a horizontal stabilizer 60*b*, such as for the airplane 10 of FIG. 1A, that does not incorporate an energy absorbing impact member, or "bird-band" of the present disclosure. The horizontal stabilizer 60*b* includes a first spar 66*b*, a second spar 64*b* and third spar 62*b*. The simulated area of impact is indicated by 68*b* with the damage from the impact indicated by 68*b*1. Portions of the horizontal stabilizer 60*b* dislodged by the simulated impact are indicated by 69*b*. Running the simulation on the structure of FIG. 3B, the horizontal stabilizer 60*b* that did not incorporate the energy absorbing impact member, or "bird-band", of the present disclosure, resulted in damage to and failure of the second spar 64b and the third spar 62b.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. An energy absorbing apparatus, comprising:
   a structure formed as a single sheet of composite material and having a leading edge, the structure comprising at least one of a blade and a propeller of an aircraft; and
   an impact member formed of a plastically deformable material of a predetermined configuration;
   the impact member being embedded within the leading edge of the composite material;
   the impact member absorbing energy from an impact of a projectile with the leading edge and redistributing the energy of the impact to the structure.

2. The energy absorbing apparatus according to claim 1, wherein:
   the plastically deformable material comprises a high strength/high strain material.

3. The energy absorbing apparatus according to claim 2, wherein:
   the high strength/high strain material is a plastic type material.

4. The energy absorbing apparatus according to claim 1, wherein:
   the plastically deformable material comprises a stainless steel.

5. The energy absorbing apparatus according to claim 4, wherein:
   the stainless steel comprises one or more of 301 ¼ hardened and 314 annealed stainless steels.

6. The energy absorbing apparatus according to claim 1, wherein:
   the plastically deformable material comprises at least one of aluminum alloy, a nickel alloy, a titanium alloy, a steel alloy.

7. The energy absorbing apparatus according to claim 1, wherein:
   the structure comprises at least one of a wing, a payload wing, a horizontal stabilizer and a vertical stabilizer of the aircraft.

8. The energy absorbing apparatus according to claim 1, wherein:
   the structure comprises the propeller or a rotor blade.

9. The energy absorbing apparatus according to claim 1, wherein:
   the plastically deformable material assists in break up of the projectile upon impact and in increasing an impact area on the structure behind the leading edge.

10. An energy absorbing system of an aircraft, comprising:
    a structure formed as a single sheet of composite material and having a leading edge, the structure comprising at least one of a wing, a horizontal stabilizer, a vertical stabilizer, a propeller, and a rotor blade; and
    an impact member formed of a plastically deformable material of a predetermined configuration;
    the impact member being embedded within the leading edge of the composite material;
    the impact member absorbing energy from an impact of a projectile with the leading edge and redistributing the energy of the impact to the structure.

11. The energy absorbing system of an aircraft according to claim 10, wherein:
    the plastically deformable material comprises at least one of stainless steel, a plastic type material, a nickel alloy, a titanium alloy, a steel alloy, an aluminum alloy.

12. The energy absorbing system of an aircraft according to claim 10, wherein:
    the plastically deformable material comprises a high strength/high strain material.

13. The energy absorbing system of an aircraft according to claim 10, wherein:
    the plastically deformable material comprises at least one of 301 ¼ hardened steel and 314 annealed stainless steel.

14. The energy absorbing system of an aircraft according to claim 10, wherein:
    the plastically deformable material assists in break up of the projectile upon impact and in increasing an impact area on the structure behind the leading edge.

15. An energy absorbing system of an aircraft, comprising:
    a sheet means forming a structure, the sheet means comprising a single sheet of composite material and having a leading edge, the structure comprising at least one of a wing, a horizontal stabilizer, a vertical stabilizer, a propeller, and a rotor blade; and
    a means for absorbing an impact being formed of a plastically deformable material;
    the means for absorbing the impact being embedded-within the leading edge of the composite material;
    the means for absorbing the impact absorbing energy of an impact of a projectile with the leading edge and redistributing the energy of the impact to the structure.

16. The energy absorbing system of an aircraft according to claim 15, wherein:
    the plastically deformable material comprises at least one of stainless steel, a plastic type material, an aluminum alloy, a nickel alloy, a titanium alloy, a steel alloy.

17. An energy absorbing method for an aircraft, comprising:
    forming a structure as a single sheet of composite material, the structure having a leading edge and comprising at least one of a wing, a horizontal stabilizer, a vertical stabilizer, a propeller, and a rotor blade; and
    embedding an impact member of plastically deformable material within the leading edge of the composite material to absorb energy from an impact of a projectile with the leading edge and redistributing the energy of the impact to the structure.

* * * * *